(12) United States Patent
Gupta et al.

(10) Patent No.: US 11,524,777 B2
(45) Date of Patent: Dec. 13, 2022

(54) INDIVIDUAL BLADE CONTROL SYSTEM FOR ROTORCRAFT

(71) Applicant: Kinetic Analytics LLC, Fountain Valley, CA (US)

(72) Inventors: Neil Rohin Gupta, Costa Mesa, CA (US); Terry Buelna, Lake Forest, CA (US)

(73) Assignee: Kinetic Analytics LLC, Fountain Valley, CA (US)

(*) Notice: Subject to any disclaimer, the term of this patent is extended or adjusted under 35 U.S.C. 154(b) by 0 days.

(21) Appl. No.: 17/634,494

(22) PCT Filed: Aug. 19, 2020

(86) PCT No.: PCT/US2020/047066
§ 371 (c)(1),
(2) Date: Feb. 10, 2022

(87) PCT Pub. No.: WO2021/034973
PCT Pub. Date: Feb. 25, 2021

(65) Prior Publication Data
US 2022/0266994 A1  Aug. 25, 2022

Related U.S. Application Data

(60) Provisional application No. 62/889,551, filed on Aug. 20, 2019.

(51) Int. Cl.
*B64C 27/605* (2006.01)
*B64C 27/72* (2006.01)

(52) U.S. Cl.
CPC ............ *B64C 27/605* (2013.01); *B64C 27/72* (2013.01); *B64C 2027/7255* (2013.01)

(58) Field of Classification Search
CPC .................. B64C 27/605; B64C 27/22; B64C 2027/7255
(Continued)

(56) References Cited

U.S. PATENT DOCUMENTS 3,448,810 A * 6/1969 Vogt ...................... B64C 27/605
416/129
3,841,586 A   10/1974 Broadley et al.
(Continued)

FOREIGN PATENT DOCUMENTS

| DE | 20314042 U1 | 3/2004 |
| EP | 0729883 A1 | 9/1996 |
| GB | 2043010 A | 10/1980 |

OTHER PUBLICATIONS

International Search Report and Written Opinion dated Jan. 5, 2021, from ISA/US, for International Patent Application No. PCT/US20/47066 (filed Aug. 19, 2020), 10 pgs.
(Continued)

*Primary Examiner* — Christopher P Ellis
(74) *Attorney, Agent, or Firm* — Ascenda Law Group, PC

(57) ABSTRACT

A blade pitch control system includes a plurality of serially stacked swashplate assemblies, each having concentric, ring-shaped inner and outer sections, an associated output pitch link coupled to its outer section and an associated input pitch link coupled to its inner section. The inner and outer sections of each swashplate assembly includes pass through holes to accommodate input pitch links and output pitch links of adjacent ones of the stacked swashplate assemblies. The system also includes a plurality of actuators, each coupled to a respective input pitch link of a respective one of the stacked swashplate assemblies. A central static mast accommodates a rotor drive shaft and the stacked swashplate assemblies are configured to slide axially, parallel to a long axis of the static mast.

13 Claims, 7 Drawing Sheets

(58) Field of Classification Search
USPC .................................................. 244/17.25
See application file for complete search history.

(56) References Cited

U.S. PATENT DOCUMENTS

| | | | |
|---|---|---|---|
| 4,379,678 A | 4/1983 | Carlock et al. | |
| 4,519,743 A | 5/1985 | Ham | |
| 4,930,988 A | 6/1990 | Griffith | |
| 5,785,497 A | 7/1998 | White et al. | |
| 6,032,899 A * | 3/2000 | Mondet | B64C 27/50 |
| | | | 416/142 |
| 6,231,005 B1 | 5/2001 | Costes | |
| 6,616,095 B2 * | 9/2003 | Stamps | B64C 27/37 |
| | | | 416/114 |
| 7,674,091 B2 | 3/2010 | Zierten | |
| 9,718,541 B2 * | 8/2017 | Darrow, Jr. | B64C 27/605 |
| 9,764,832 B2 * | 9/2017 | Hoyle | B64C 27/605 |
| 9,994,310 B2 * | 6/2018 | Podgurski | B64C 27/59 |
| 10,112,708 B2 * | 10/2018 | Darrow, Jr. | B64C 27/32 |
| 10,450,058 B2 * | 10/2019 | Miller | B64C 29/0033 |
| 10,597,151 B2 * | 3/2020 | Avery | B64C 27/625 |
| 2008/0111399 A1 | 5/2008 | Zierten | |
| 2010/0003133 A1 * | 1/2010 | Welsh | B64C 27/10 |
| | | | 416/31 |
| 2011/0097208 A1 | 4/2011 | Girard | |
| 2013/0119187 A1 * | 5/2013 | Germanetti | B64C 27/615 |
| | | | 416/134 A |
| 2015/0086358 A1 * | 3/2015 | Filter | B64C 27/32 |
| | | | 416/134 A |
| 2017/0057629 A1 * | 3/2017 | Halcom | B64C 27/68 |
| 2017/0152034 A1 * | 6/2017 | Gräber | B64C 27/72 |
| 2019/0382107 A1 * | 12/2019 | Shimek | B64C 27/605 |
| 2021/0163128 A1 * | 6/2021 | Stamps | B64C 27/605 |
| 2021/0214077 A1 * | 7/2021 | Cox | B64C 27/605 |

OTHER PUBLICATIONS

International Preliminary Report on Patentability dated Aug. 20, 2021, from IPEA/US for International Patent Application No. PCT/US20/47066 (filed Aug. 19, 2020), 15 pgs.

* cited by examiner

INDIVIDUAL BLADE CONTROL SYSTEM FOR ROTORCRAFT

RELATED APPLICATIONS

This application claims priority to U.S. Provisional Application No. 62/889,551, filed 20 Aug. 2019.

FIELD OF THE INVENTION

The present invention relates to a blade control system for a rotorcraft such as a helicopter or tilt-rotor/tilt-wing aircraft, and in particular to such a system as permits control of the pitch of a blade of such a rotorcraft individually and independently of the pitch of other blades thereof.

BACKGROUND

As illustrated in FIG. 7, in a rotary wing aircraft, such as a helicopter, it is customary for a plurality of blades 30 to be supported by a rotor 32 at the end of a motor-driven mast 36, with each blade extending radially outwards from the rotor. The rotation and orientation of the blades 30 provides both lift and thrust for the aircraft. Generally, during rotation of the blades about a central axis, the pitch of each blade governs the movement of the aircraft and is controlled by a swashplate assembly 38. The swashplate assembly has an upper, rotating section 40 and a lower, stationary section 42. Each of the upper and lower sections 40, 42 of the swashplate assembly 38 are in the form of rigid plates, with only a central opening for the mast 36 to pass therethrough. The upper section 40 rotates with the rotor 32 and can tilt in any direction. The upper section 40 is coupled to the blades 30 at pitch horns 48 through pitch link arms 44, thus any tilting of the upper section 40 is imparted to the blades. The lower section 42 of the swashplate assembly 38 does not rotate, but can be tilted (e.g., with respect to a central axis defined by the mast 36) though the actuation of arms 46 according to operation of the aircraft's cyclic control. The upper 40 and lower 42 sections of the swashplate assembly 38 are coupled to one another through a bearing, hence, any tilting of the lower section 42 is imparted to the upper section 40 and, hence, to the blades 30. The entire swashplate assembly 38 can be raised or lowered through operation of the aircraft's collective control.

When rotating, each blade creates a wake, that is, a trail of disturbed air. For a given rotor system, the wake created by each passing blade is encountered by the subsequent blade and the resulting turbulence creates unwanted vibration in the rotor system and reduces the effectiveness of the subsequent blade and increasing the power required for a given thrust. This wake turbulence is particularly apparent in a rotorcraft undergoing "edgewise" flight where the rotor is producing thrust in the vertical direction and in the lateral direction. As the rotor moves forward through the air, on one side of the rotor a blade is "advancing" into the oncoming edgewise airflow while on the other side of the rotor the blade is "retreating" away from the airflow. This difference in the relative airflow seen by a blade as it rotates through edgewise flight creates unstable lift and flow across the rotor.

It is desirable to reduce the turbulence encountered by subsequent blades in a rotor system. This has been accomplished in laboratory testing through the oscillation of the subsequent blade at a rate several times per revolution. The wake generated by a passing blade is shed off in an alternating pattern off the top and bottom of the blade. When a subsequent blade can oscillate several times per revolution it is able to match the periodicity of the shedding vortices produced by the initial passing blade. This motion is ideally conducted for each of N rotor blades at a rate greater than N−1 per revolution and is accomplished through what is termed individual blade control ("IBC"). Individual control of a blade throughout its rotation around the rotor can reduce the unstable dynamics of edgewise flight. Similarly, in a tilt-rotor or tilt-wing aircraft a rotor transitions from helicopter-like edgewise flight into a dynamic regime where a combination of axial flow and edgewise flow are present. Buffeting and the associated increase in noise can be reduced through the individual blade control of a rotor.

The perceived advantages of IBC in rotorcraft have not been realized in field applications because of limitations in the size and power of current laboratory systems. Current systems are either too large for practical flight operation or lack sufficient high frequency force to produce the desired motion. U.S. Pat. No. 7,674,091 describes an IBC mechanism for controlling the pitch of blades of rotor blade system using actuators that control the axial displacement of mechanical linkages disposed in the annulus of a rotor mast.

SUMMARY OF THE INVENTION

A blade pitch control system according to one embodiment of the present invention includes a plurality of serially stacked swashplate assemblies, each including concentric, ring-shaped inner and outer sections, an associated output pitch link coupled to its outer section and an associated input pitch link coupled to its inner section. The inner and outer sections of each respective swashplate assembly includes pass through holes to accommodate respective input pitch links and output pitch links of adjacent ones of the stacked swashplate assemblies. The pitch control system also includes a plurality of actuators, each coupled to a respective input pitch link of a respective one of the stacked swashplate assemblies. A static mast may be disposed centrally to the plurality of serially stacked swashplate assemblies, and a rotor drive shaft may pass through a center of the static mast. The stacked swashplate assemblies may be configured to slide axially, parallel to a long axis of the static mast, within an outer guide sleeve surrounding the static mast and/or along an inner guide sleeve surrounding the static mast. For example, each of the stacked swashplate assemblies may include a plurality of guide roller mechanisms arranged on the inner and/or outer sections to accommodate sliding of the stacked swashplate assemblies along the inner guide sleeve and/or within the outer guide sleeve.

A further embodiment of the invention provides a mechanism for controlling pitch of each of a plurality of blades of an aircraft rotor system independently of other blades of the rotor system. Such a mechanism includes a hollow annular static mast disposed centrally in a rotating hub and having a rotor drive shaft passing therethrough. A plurality of sliding swashplate mechanisms, one for each individual blade of the rotor system, are disposed circumferentially outside of the static mast and stacked one atop the other in a serial arrangement. Each swashplate mechanism includes an inner section configured to remain rotationally static with the static mast and to slide axially parallel to a long axis of the static mast, and an outer section configured to rotate synchronously with the rotating hub. The plurality of sliding swashplate mechanisms may be contained in a housing, and a plurality of guide roller mechanisms arranged on the inner and/or outer section of each swashplate mechanism accommodates sliding of the swashplate mechanism along an inner guide sleeve and/or within an outer guide sleeve disposed within the housing. For example, each swashplate mechanism may include a guide roller mechanism arranged on its inner section to slidingly engage a rail of an inner guide sleeve within the housing.

The inner section of each swashplate mechanism may include an inner linkage coupled axially to a respective one of a plurality of actuators, e.g., rotary actuators or linear actuators. Further, the outer section of each swashplate mechanism may include an outer linkage for coupling to a respective one of the blades of the rotor system. The inner and outer sections of each swashplate mechanism thus may include holes to accommodate passage of inner linkages and outer linkages of others of the plurality of swashplate mechanisms therethrough.

These and further embodiments of the invention are described in greater detail below.

BRIEF DESCRIPTION OF THE DRAWINGS

The present invention is illustrated by way of example, and not limitation, in the figures of the accompanying drawings, in which.

DESCRIPTION

Figure 1:
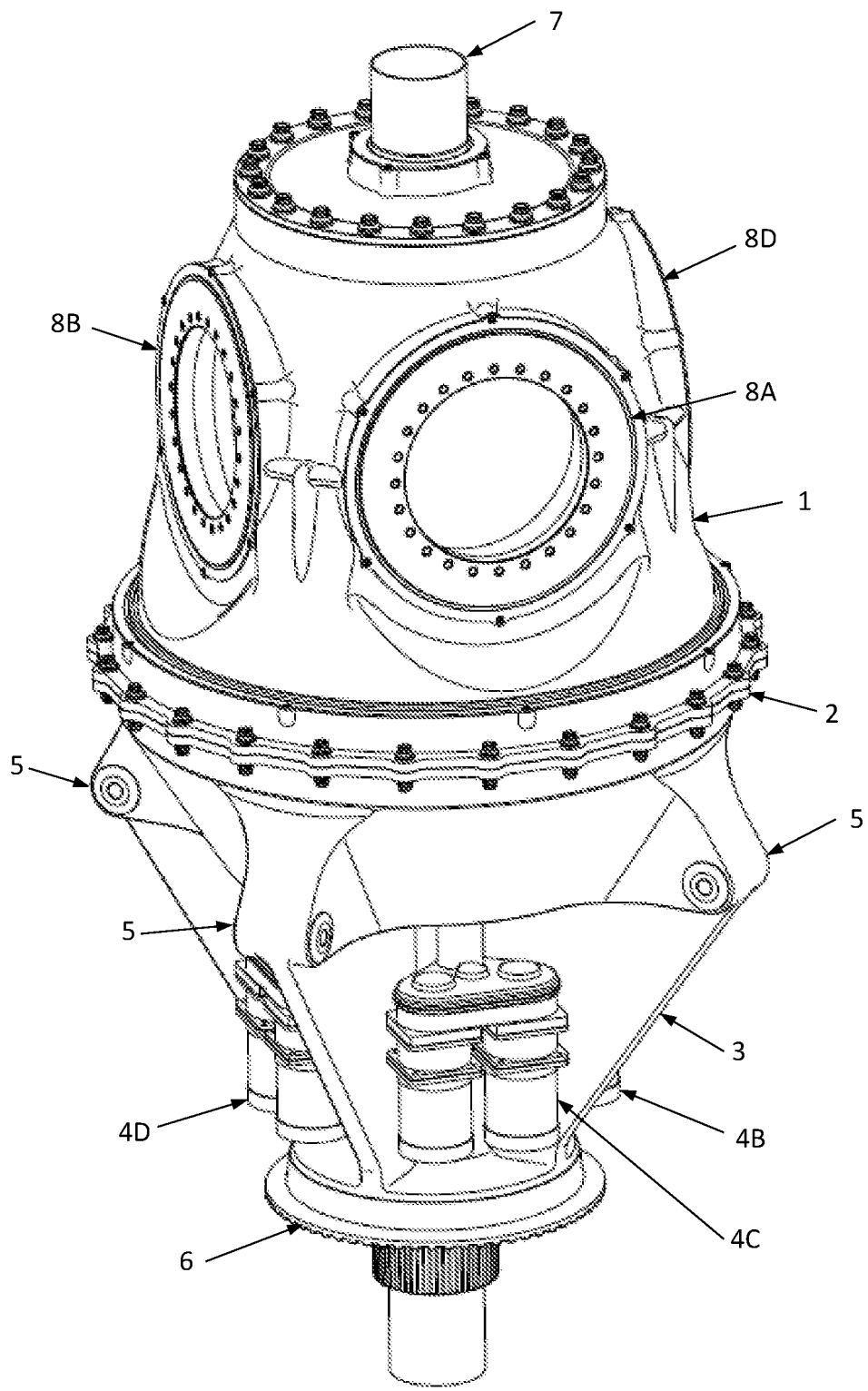
FIG. 1 is an isometric external view of a rotor system unit of a helicopter or other rotorcraft configured in accordance with an embodiment of the present invention.

Described below is a blade control system for a rotorcraft such as a helicopter or tilt-rotor/tilt-wing aircraft, which system permits control of the pitch of a blade of such a rotorcraft individually and independently of the pitch of other blades thereof. Blade control systems configured in accordance with the present invention provide a robust, compact, high performance mechanism which enables individual control of each blade in a multi-bladed rotor system. Such rotor systems may also advantageously be provided reductions in noise and power consumption throughout a flight regime, in particular during edgewise flight and rotor transitions, through use of a blade control system configured in accordance with the present invention.

As will be apparent from the following description, when read in view of the accompanying drawings, a blade control system configured in accordance with one embodiment of the invention includes a plurality of serially stacked swashplates, one for each blade of a rotor system, which move either together (for collective control) or independently (for cyclic or individual blade control), in response to a pilot's inputs. Unlike the plate-like structure of swashplates commonly used in conventional swashplate assemblies, swashplate mechanisms configured in accordance with the present invention include concentric, ring-shaped sections, with large, open centers (e.g., the swashplate assemblies are circular with empty or hollow centers) to allow the pass through of not only the drive shaft of the rotor system but other auxiliary components as well. Each swashplate mechanism has an associated output pitch link (e.g., for connection to a pitch horn of an associated blade of a rotor system) located in a rotating frame (outer race segment) and an input pitch link located in a non-rotating frame (inner race segment). Pass through features are included in each swashplate assembly's inner race element to allow pitch links from adjacent swashplates to pass through. When installed in a rotor system, a static mast runs centrally through the stack of swashplate mechanisms.

Thus, in one embodiment the present invention provides a mechanism for controlling the pitch of each of the blades of an aircraft rotor system independently of the other blades. The mechanism includes a hollow, annular, static mast disposed centrally in a rotating hub. The use of a hollow, annular, static mast allows the rotor drive shaft to pass through the center of the pitch control mechanism. A plurality of sliding swashplate mechanisms, one for each individual rotor blade of the rotor system, are disposed circumferentially outside of the central static mast and are stacked one atop the other in a serial arrangement. The inner section of each swashplate mechanism is rotationally static with the mast and is configured to slide axially parallel to the long axis of the static mast. The outer portion of each swashplate mechanism rotates synchronously with the rotating hub.

The stack of swashplate mechanisms is contained in a housing, thereby allowing for presence of an oil spray system to lubricate the mechanisms. An inner linkage on each swashplate mechanism is coupled axially below the swashplate mechanism to an individual actuator (e.g., a rotary or linear actuator, driven hydraulically or electrically). As there are as many swashplates as there are blades of the rotor system, so too there are as many actuators for each rotor blade of the rotor system. Pass through features in each inner, non-rotating portion of the swashplate mechanisms allow the inner linkages of swashplate mechanisms arranged higher in the stack to pass therethrough for connection to respective ones of the actuators, which are mounted outside the swashplate mechanism housing. An outer pitch linkage of each swashplate mechanism is for attachment to a respective pitch horn of each individual blade of the rotor system, and rotates with the outer section of each swashplate mechanism and the hub. Pass through features in each swashplate mechanism's outer section allow the outer pitch links of swashplate mechanisms lower in the stack to pass therethrough. The outer periphery of each swashplate mechanism slides along a keyed sliding feature (e.g., a rail) within an annular outer pitch mechanism housing affixed to the rotating hub using axially separated rollers to reduce contact stresses and increase the bending stiffness of the sliding swashplate mechanism. The outer pitch mechanism annular housing is isolated from the bending and torsional load paths of the hub system in the hub mounting structure.

The present mechanism for controlling the pitch of each of a plurality of blades of a rotor system may be used with any of a variety of rotorcraft, e.g., helicopters, rotor or tilt-rotor aircrafts, or other crafts, having at least one main rotor with a hub and plurality of blades coupled thereto. The blade pitch control mechanism may be coupled to the hub and the blades of the rotor and may control the pitch of each of the blades independently of the pitch of the other blades. For example, the blade pitch control mechanism may include individual output actuator pitch links, one for each blade of a rotor system, providing individually operable control of individual blades of the rotor system via a plurality of respective, individual actuators. For an N-blade rotor system, individual blade control for controlling each of the N rotor blades is thus provided via N sliding swashplate mechanisms, situated concentrically to a central static mast, with each of the swashplate mechanisms having an outer rotating portion and inner static portion and configured to slide axially through a range of motion, e.g., sufficient to generate at least 30 degrees of rotor blade pitch.

Figure 2:
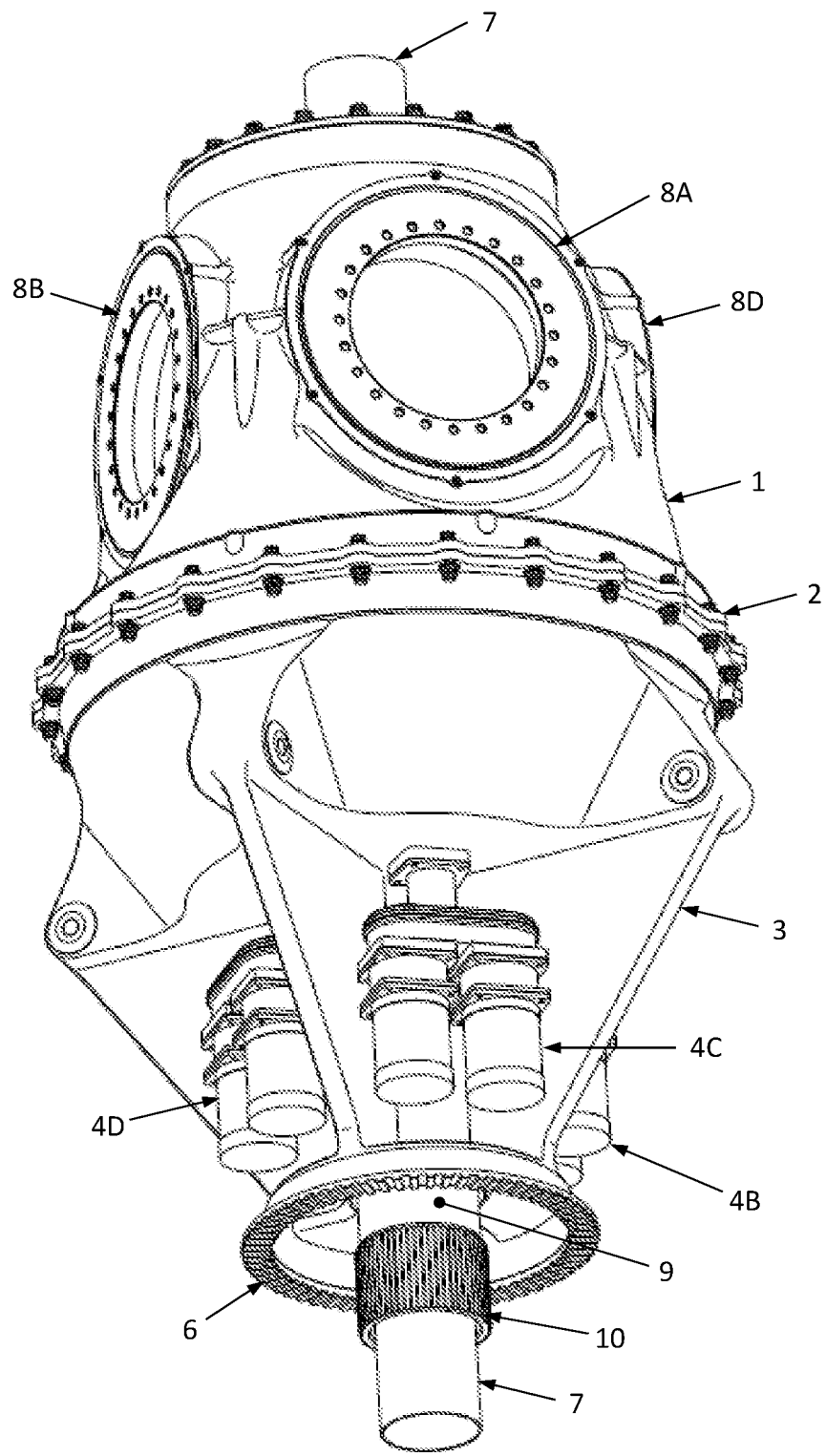
FIG. 2 illustrates the rotor system of FIG. 1 shown isometrically from below the rotor.
Figure 3:
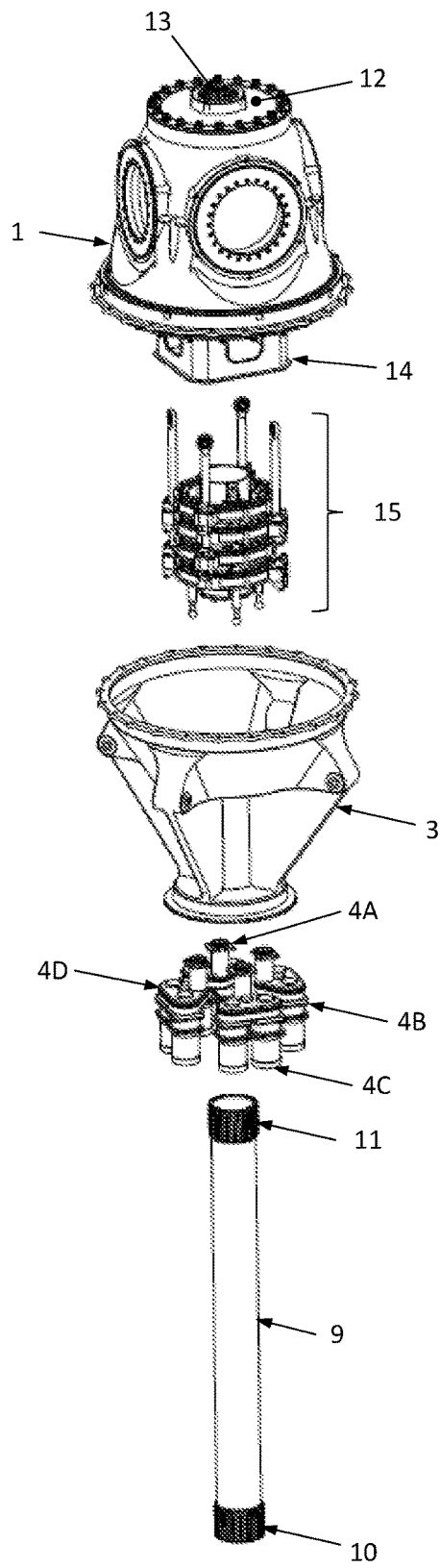
FIG. 3 illustrates an exploded view of the rotor system of FIG. 1.
Figure 4:
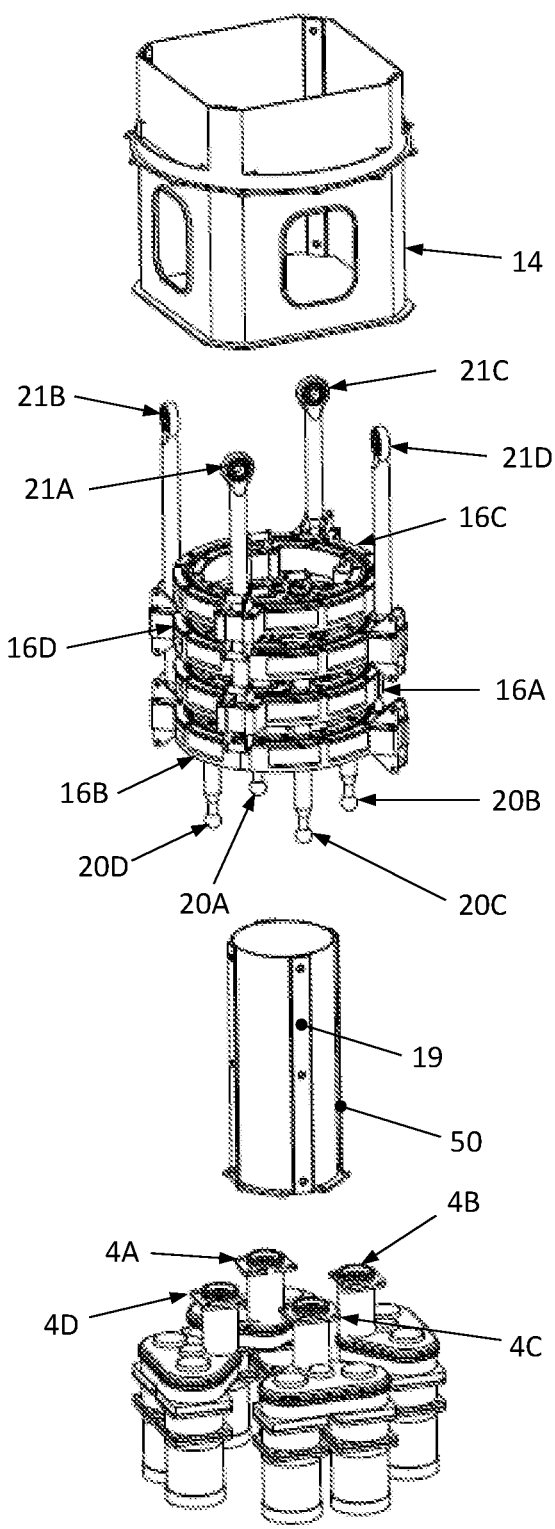
FIG. 4 illustrates aspects of the individual blade control elements for the rotor system of FIG. 1.
Figure 5:
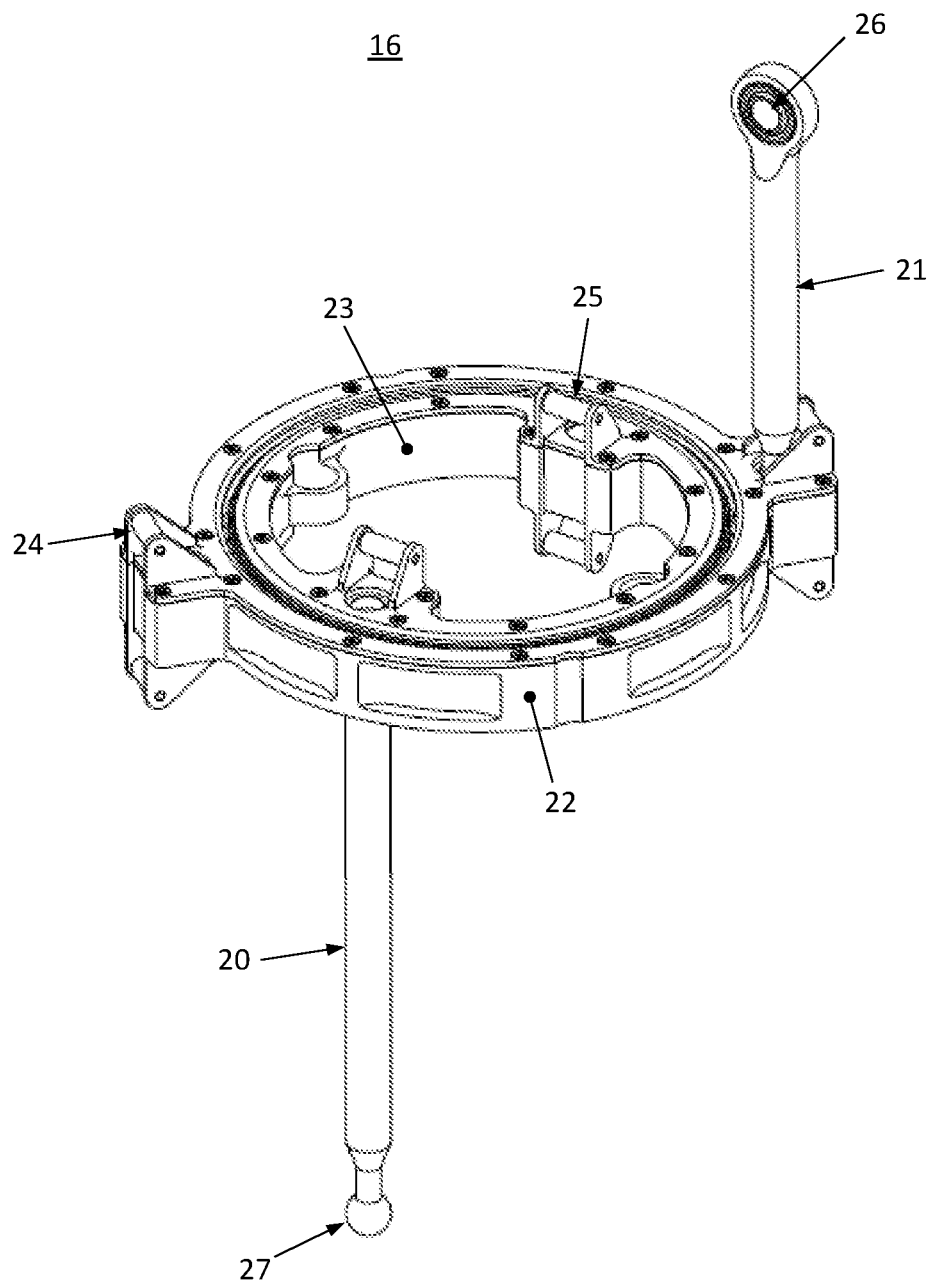
FIG. 5 shows an individual swashplate mechanism of the present rotor control system in detail.
Figure 6:
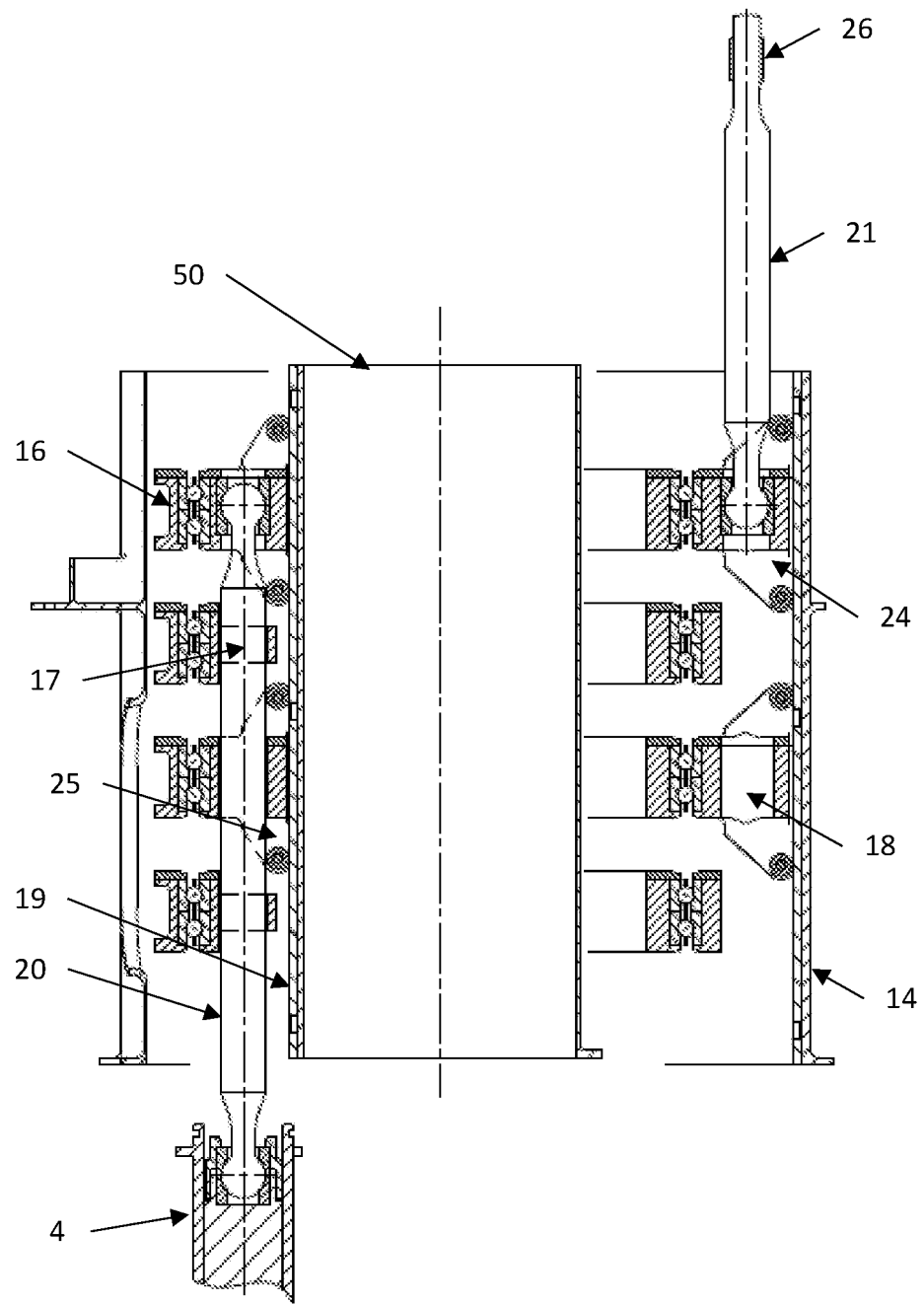
FIG. 6 illustrates a cross section view of the swashplate mechanism of FIG. 5.
Figure 7:
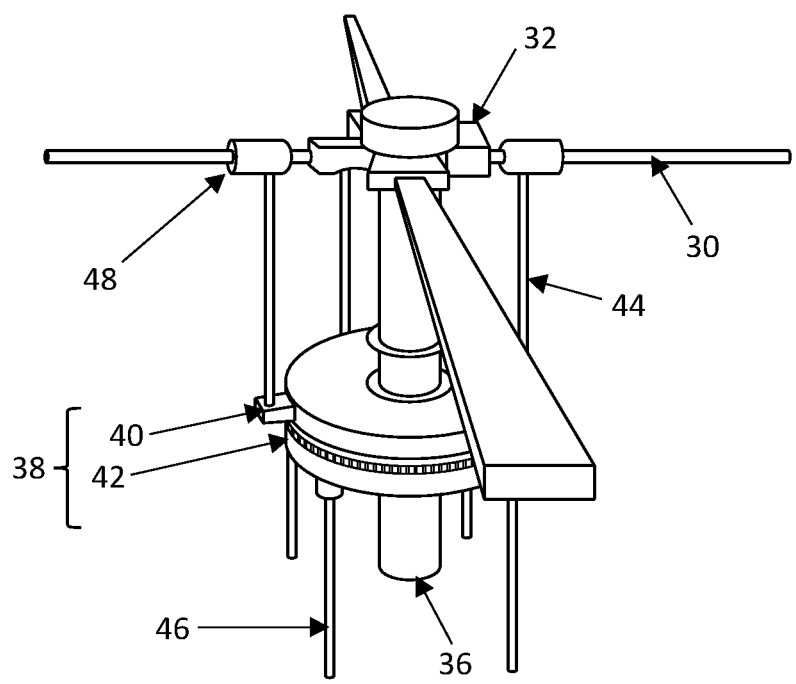
FIG. 7 illustrates an example of a conventional swashplate assembly for a rotorcraft.

Referring now to FIGS. 1-6, in which like elements are referenced by similar numbers, an embodiment of a rotor system unit configured in accordance with the present invention is shown. The illustrated rotor system is adapted for use with a helicopter or other rotorcraft. Although not shown in detail in the drawings, it should be appreciated that other elements of such an aircraft, e.g., a fuselage, blades, one or more engines or electric motors to drive rotation of the blades, etc., would be a part of any such rotorcraft. Furthermore, throughout this description some components are designated by a number-letter combination, e.g., #A-#N, where "N" is a letter representing an integer number of blades of the rotor system, typically a value from 2 through 6 (e.g., where "N" is the letter "D", this indicates a 4-rotor system). The illustrated embodiments described herein use element labels with #A-#D, but this is only for convenience and in general the present system may be used in rotor systems having any number of blades.

The illustrated rotor system includes a hub structure 1 that acts as a central load carrying member, supporting the individual blades (not shown), which are each attached at their own bearing mount interfaces 8A-8D. The hub 1 is supported by a bearing assembly 2, allowing the hub to rotate freely with respect to a static housing 3, which is mounted to the rotorcraft at mountings lugs 5. A coupling 6 connects a driving input shaft of the rotor assembly to a rotating power source or drive train (not shown). Blades attached to the mount interfaces 8A-8D are able to rotate (pitch) about their long (feather) axis. This pitching (feathering) of a blade increases or decreases the blade's lift while the blade rotates around the rotor axis. A plurality of actuators 4A-4D drive the individual pitching motion of the blades (through pitch linkages as discussed below) and are mounted circumferentially around the static housing 3.

A rotor drive shaft 9 runs axially the length of the housing. One will note that because of the design of the present IBC system, this drive shaft is capable of being hollow, allowing the passage of cables or other devices, to and through the hub. A lower spline 10 couples torque into the drive shaft, and a notional hollow static torque tube 7 passes through the center of the lower housing, hub, and gearbox (not shown). This allows for the mounting of sensor systems above the rotor. An upper spline 11 is located at the end of the drive shaft 9 opposite the lower spline 10.

The individual blade control actuators 4A-4D are mounted to the lower portion of the static housing 3. Within this housing is located the swashplate assembly stack 15. There is a single swashplate assembly 16 per blade within the rotor system. A configuration for 4-blade rotor system is shown, although various configurations from 2-N(N being an integer typically, but not necessarily, less than or equal to 6) are contemplated.

The rotation of the swashplates is restricted by a swashplate outer guide sleeve 14 which is attached to the hub 1 and is part of the rotating frame. The drive shaft upper spline 11 connects the drive shaft 9 to hub 1 at an upper most hub drive plate 12 through a hub upper spline 13.

As mentioned, individual swashplate assemblies 16 exist for each of the N rotor blades in a rotor (N=4 being shown in the illustrated embodiment). Each swashplate assembly 16 includes a respective one of a plurality of input pushrods 20A-20D and a respective one of a plurality of output pushrods 21A-21D. The swashplate assemblies 16 are ring-shaped (e.g., circular and hollow on the interior), allowing for an inner swashplate guide sleeve 50 to fit inside the stacked swashplate assemblies. Sleeve 50 is itself hollow so that additional equipment as well as the drive shaft 9 can pass through the hub. The swashplate assemblies 16 slide along the inner guide sleeve 50 on a hardened race (or rail) 19. The swashplate assembly 15 is housed inside the outer swashplate guide sleeve 14. The individual actuators 4A-4D drive respective ones of the swashplate assemblies 16A-16D in an axial direction. These actuators 4A-4D are here shown as dual redundant actuators, but other configurations are contemplated.

Each individual swashplate assembly 16 includes an input pushrod 20 attached to an inner, non-rotating ring 23 of the swashplate assembly 16. This inner ring 23 has two axially spaced guide roller mechanisms 25, which allow the inner ring to slide longitudinally along race 19 of inner guide sleeve 50, parallel to the rotation axis of the rotor. The rotating outer portion 22 of each swashplate assembly 16 houses two outer guide roller mechanisms 24 and serves as the attachment point for the output pushrod 21, at the end of which is a rod end 26 for attachment to the control horn of a blade.

The swashplate assemblies 16 slide axially along the inner guide sleeve 50, their roller mechanisms 25 sliding along the hardened inner race 19 and outer roller mechanisms 24 sliding along the interior of the outer guide sleeve 14. The input and output pushrods 20, 21 of various ones of the swashplate mechanisms in the stack pass through adjacent ones of swashplate mechanisms via pass through holes 17, 18, respectively, in the inner and outer swashplate mechanisms.

Thus, a blade control system for a rotorcraft which permits control of the pitch of a blade of the rotorcraft individually and independently of the pitch of other blades thereof has been described. In various embodiments, a blade pitch control system according to the present invention includes a plurality of serially stacked swashplate assemblies, each having concentric, ring-shaped inner and outer sections, an associated output pitch link coupled to its outer section and an associated input pitch link coupled to its inner section. The inner and outer sections of each respective swashplate assembly includes pass through holes to accommodate respective input pitch links and output pitch links of adjacent ones of the stacked swashplate assemblies. The blade control system further includes a plurality of actuators, each coupled to a respective input pitch link of a respective swashplate assembly. The blade pitch control system also may include a static mast disposed centrally to the plurality of serially stacked swashplate assemblies, and a rotor drive shaft passing through a center of the static mast. The stacked swashplate assemblies are preferably configured to slide axially, parallel to a long axis of the static mast, within an outer guide sleeve surrounding the static mast and along an inner guide sleeve surrounding the static mast. Accordingly, each of the stacked swashplate assemblies preferably includes a plurality of guide roller mechanisms arranged on the inner and outer sections to accommodate sliding of the stacked swashplate assemblies along the inner guide sleeve and within the outer guide sleeve.

In further embodiments, a mechanism for controlling pitch of each of a plurality of blades of an aircraft rotor system independently of other blades of said rotor system includes a hollow annular static mast disposed centrally in a rotating hub and having a rotor drive shaft pass therethrough, and a plurality of sliding swashplate mechanisms, one for each individual blade of the rotor system. The swashplate mechanisms are disposed circumferentially outside of the static mast and stacked one atop the other in a serial arrangement. Each swashplate mechanism includes an inner section configured to remain rotationally static with the static mast and to slide axially parallel to a long axis of the static mast, and an outer section configured to rotate synchronously with the rotating hub. The sliding swashplate mechanisms are preferably contained in a housing. The inner section of each swashplate mechanism includes an inner linkage coupled axially to a respective one of a plurality of actuators (e.g., a rotary actuator or a linear actuator). The outer section of each swashplate mechanism includes an outer linkage for coupling to a respective one of the blades of the rotor system. The inner and outer sections of each swashplate mechanism includes holes to accommodate passage of inner linkages and outer linkages of others of the plurality of swashplate mechanisms therethrough. Each swashplate mechanism also includes a plurality of guide roller mechanisms arranged on its inner and outer sections to accommodate sliding along an inner guide sleeve (e.g., along a rail thereof) and within an outer guide sleeve disposed within the housing.

What is claimed is:

1. A blade pitch control system, comprising a plurality of serially stacked swashplate assemblies, one respective swashplate assembly for each of a corresponding plurality of blades of a rotor system and each respective swashplate assembly of the plurality of swashplate assemblies including concentric, ring-shaped non-rotating and rotating sections, an associated output pitch link coupled to its rotating section and an associated input pitch link coupled to its non-rotating section, the non-rotating and rotating sections of each respective swashplate assembly including pass through holes to accommodate respective input pitch links and output pitch links of adjacent ones of the stacked swashplate assemblies; and a plurality of actuators, each respective one of the plurality of actuators coupled to a respective input pitch link of a respective one of the stacked swashplate assemblies.

2. The blade pitch control system of claim 1, further comprising a static mast disposed centrally to the plurality of serially stacked swashplate assemblies.

3. The blade pitch control system of claim 2, further comprising a rotor drive shaft passing through a center of the static mast.

4. The blade pitch control system of claim 2, wherein the stacked swashplate assemblies are configured to slide axially, parallel to a long axis of the static mast, within an outer guide sleeve surrounding the static mast.

5. The blade pitch control system of claim 4, wherein the stacked swashplate assemblies are further configured to slide axially, parallel to the long axis of the static mast, along an inner guide sleeve surrounding the static mast.

6. The blade pitch control system of claim 4, wherein each respective swashplate assembly of the stacked swashplate assemblies includes a plurality of guide roller mechanisms arranged on the inner and outer sections to accommodate sliding of the stacked swashplate assemblies along the inner guide sleeve and within the outer guide sleeve.

7. The blade pitch control system of claim 1, further comprising a hollow annular static mast disposed centrally in a rotating hub, the static mast having a rotor drive shaft passing therethrough, wherein the plurality of serially stacked swashplate assemblies are disposed circumferentially outside of the static mast, the non-rotating section of each respective swashplate assembly is configured to remain rotationally static with the static mast and to slide axially parallel to a long axis of the static mast, and the rotating section of each respective swashplate assembly is configured to rotate synchronously with the rotating hub.

8. The blade pitch control system of claim 7, wherein the plurality of swashplate assemblies are contained in a housing.

9. The blade pitch control system of claim 8, wherein each of the plurality of actuators comprises a rotary actuator.

10. The blade pitch control system of claim 8, wherein each of the plurality of actuators comprises a linear actuator.

11. The blade pitch control system of claim 8, wherein the output pitch links are each for coupling to a respective one of the corresponding plurality of blades of the rotor system.

12. The blade pitch control system of claim 11, wherein each swashplate assembly includes a plurality of guide roller mechanisms arranged on its non-rotating and rotating sections to accommodate sliding along an inner guide sleeve and within an outer guide sleeve disposed within the housing.

13. The blade pitch control system of claim 11, wherein each swashplate assembly includes a guide roller mechanism arranged on its non-rotating section to slidingly engage a rail of an inner guide sleeve within the housing.

* * * * *